(12) United States Patent
Kang et al.

(10) Patent No.: US 11,061,815 B2
(45) Date of Patent: Jul. 13, 2021

(54) MEMORY SYSTEM, MEMORY CONTROLLER AND OPERATING METHOD

(71) Applicant: SK hynix Inc., Gyeonggi-do (KR)

(72) Inventors: Hye Mi Kang, Gyeonggi-do (KR); Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 38 days.

(21) Appl. No.: 16/774,287

(22) Filed: Jan. 28, 2020

(65) Prior Publication Data

US 2021/0004324 A1 Jan. 7, 2021

(30) Foreign Application Priority Data

Jul. 5, 2019 (KR) .................. 10-2019-0081025

(51) Int. Cl.
| | | |
|---|---|---|
| *G06F 12/02* | (2006.01) | |
| *G06F 13/16* | (2006.01) | |
| *G06F 9/30* | (2018.01) | |
| *G06F 9/54* | (2006.01) | |

(52) U.S. Cl.
CPC ...... *G06F 12/0246* (2013.01); *G06F 9/30087* (2013.01); *G06F 9/544* (2013.01); *G06F 12/0253* (2013.01); *G06F 13/1673* (2013.01); *G06F 13/1689* (2013.01); *G06F 2212/7205* (2013.01)

(58) Field of Classification Search
None
See application file for complete search history.

(56) References Cited

U.S. PATENT DOCUMENTS

| | | | | |
|---|---|---|---|---|
| 8,364,918 | B1* | 1/2013 | Smith ................ | G06F 12/0246 711/159 |
| 2006/0161724 | A1* | 7/2006 | Bennett .............. | G06F 12/0246 711/103 |
| 2013/0036261 | A1* | 2/2013 | Kim .................... | G06F 11/1048 711/103 |
| 2016/0188208 | A1* | 6/2016 | Kim .................... | G06F 12/0253 711/103 |
| 2016/0188220 | A1* | 6/2016 | Nemoto ............... | G06F 3/0611 711/103 |
| 2020/0042438 | A1* | 2/2020 | Yi ....................... | G06F 12/0891 |
| 2020/0218652 | A1* | 7/2020 | Huang ................ | G06F 12/0253 |

FOREIGN PATENT DOCUMENTS

| | | |
|---|---|---|
| KR | 10-2016-0078611 | 7/2016 |
| KR | 10-1718888 | 4/2017 |
| KR | 10-2018-0062247 | 6/2018 |

\* cited by examiner

*Primary Examiner* — Nathan Sadler
(74) *Attorney, Agent, or Firm* — IP & T Group LLP

(57) ABSTRACT

A memory system, a memory controller and an operating method are disclosed. By determining a time for garbage collection, based on information for a write command group including a plurality of write commands inputted from a host, it is possible to minimize a time in which processing a command transmitted from the host is delayed due to garbage collection, and ensure stable write performance.

20 Claims, 17 Drawing Sheets

GC_TIME = MIN( TH_GC_TIME, PC*(1/(WR_SPEED)) )  　＊ PC: Proportional constant

FIG. 14

ENTRY_BUF

| | | IDX[0] | IDX[1] | IDX[2] | IDX[3] | IDX[4] |
|---|---|---|---|---|---|---|
| T1 (WR_CMD_1) | TR_TIME | A | | | | |
| | WR_SIZE | 10 | | | | |
| T2 (WR_CMD_2) | TR_TIME | A | B | | | |
| | WR_SIZE | 10 | 25 | | | |
| T3 (WR_CMD_3) | TR_TIME | A | B | C | | |
| | WR_SIZE | 10 | 25 | 15 | | |
| T4 (WR_CMD_4) | TR_TIME | A | B | C | D | |
| | WR_SIZE | 10 | 25 | 15 | 7 | |

$WR\_SPEED = (10 + 25 + 15 + 7) / (D - A)$

MEMORY SYSTEM, MEMORY CONTROLLER AND OPERATING METHOD

CROSS-REFERENCE TO RELATED APPLICATION

The present application claims priority under 35 U.S.C. 119(a) to Korean Patent Application No. 10-2019-0081025 filed on Jul. 5, 2019, which is incorporated herein by reference in its entirety.

BACKGROUND

1. Technical Field

Various embodiments relate to a memory system, a memory controller and an operating method.

2. Related Art

A memory system corresponding to a storage device is a device which stores data based on a request from a host such as a computer, a mobile terminal such as a smartphone and a tablet, or various electronic devices. The memory system may include not only a device which stores data in a magnetic disk, such as a hard disk drive (HDD), but also a device which stores data in a nonvolatile memory, such as a solid state drive (SDD), a universal flash storage (UFS) device and an embedded MMC (eMMC) device.

The memory system may further include a memory controller for controlling a memory device. The memory controller may receive a command from a host, and may perform or control an operation for reading, writing or erasing data on a volatile memory or a nonvolatile memory included in the memory system, based on the received command.

In a data write operation in a conventional memory device, garbage collection may be performed to secure a free memory block and ensure write performance for the memory device which may not overwrite bits or bytes of data. When a command is inputted from the host while garbage collection is performed, an operation responsive to the command may be delayed. Thus, the host may determine that the overall performance of a memory system is degraded.

SUMMARY

Various embodiments are directed to a memory system, a memory controller and an operating method capable of minimizing a time in which processing a command transmitted from a host is delayed due to garbage collection.

Also, various embodiments are directed to a memory system, a memory controller and an operating method capable of ensuring stable write performance.

Further, various embodiments are directed to a memory system, a memory controller and an operating method capable of securing free memory blocks in advance, before the number of free memory blocks becomes insufficient.

Embodiments of the disclosure may provide a memory system including: a memory device including a plurality of memory blocks; and a memory controller configured to control the memory device.

The memory controller may determine a time for garbage collection, based on information for a write command group including a plurality of write commands inputted from a host.

The information of the write command group may include, for each write command included in the write command group, transmission time information indicating a time point at which the host transmits the write command and write size information indicating a write data size of the write command.

The write command group may include N number of write commands which are most recently transmitted by the host, where N is a natural number.

The transmission time information may be absolute time information generated by the host.

The information for the write command group may be stored in an entry buffer which includes a plurality of entries. Each of the plurality of entries stored in the entry buffer may include transmission time information and write size information for a corresponding write command included in the write command group.

The time for the garbage collection may be determined based on a write data speed that is calculated based on all or a part of the information for the write command group.

Another embodiment of the disclosure may provide a memory controller including: a memory interface configured to communicate with a memory device including a plurality of memory blocks; and a control circuit configured to control the memory device.

The control circuit may determine a time for garbage collection, based on information for a write command group including a plurality of write commands inputted from a host.

The information for the write command group may include, for each write command included in the write command group, transmission time information indicating a time point at which the host transmits the write command and write size information indicating a write data size of the write command.

The write command group may include N number of write commands of a plurality of write commands transmitted by the host, which are most recently transmitted, where N is a natural number.

The transmission time information may be absolute time information generated by the host.

The information of the write command group may be stored in an entry buffer which includes a plurality of entries. Each of the plurality of entries stored in the entry buffer may include transmission time information and write size information for a corresponding write command included in the write command group.

The time for the garbage collection may be determined based on a write data speed that is calculated based on all or a part of the information for the write command group.

Another embodiment of the disclosure may provide a method for operating a memory system suitable for controlling a memory device.

The method for operating a memory system may include receiving a plurality of write commands from a host.

The method for operating a memory system may include determining a time for garbage collection, based on information for a write command group which includes a plurality of write commands inputted from the host.

The information for the write command group may include, for each write command included in the write command group, transmission time information indicating a time point at which the host transmits the write command and write size information indicating a write data size of the write command.

The write command group may include N number of write commands of a plurality of write commands transmitted by the host, which are most recently transmitted, where N is a natural number.

The transmission time information may be absolute time information generated by the host.

The information of the write command group may be stored in an entry buffer which includes a plurality of entries. Each of the plurality of entries stored in the entry buffer may include transmission time information and write size information for a corresponding write command included in the write command group.

Another embodiment of the disclosure may provide a memory system including: a memory device including a plurality of memory blocks and a memory controller.

The memory controller may be configured to estimate a workload, which corresponds to a plurality of commands inputted from an external device, based on an input time of the command and s size of data associated with the command.

The memory controller may be configured to determine an available time for a garbage collection operation based on estimated workload.

The memory controller may be configured to perform the garbage collection operation for the available time to secure at least one free block among the plurality of memory blocks.

According to an embodiment of the disclosure, it is possible to minimize a time in which processing a command transmitted from a host is delayed due to garbage collection.

Also, according to an embodiment of the disclosure, it is possible to ensure stable write performance.

Further, according to an embodiment of the disclosure, it is possible to secure free memory blocks in advance before the number of free memory blocks becomes insufficient.

BRIEF DESCRIPTION OF THE DRAWINGS

FIGS. 14 and 15 are diagrams for describing a method of calculating a write data speed in the memory system in accordance with an embodiment of the disclosure.

DETAILED DESCRIPTION

Hereinafter, a memory system, a memory controller and an operating method will be described below in detail with reference to the accompanying drawings through various examples of embodiments of the disclosure.

Figure 1:
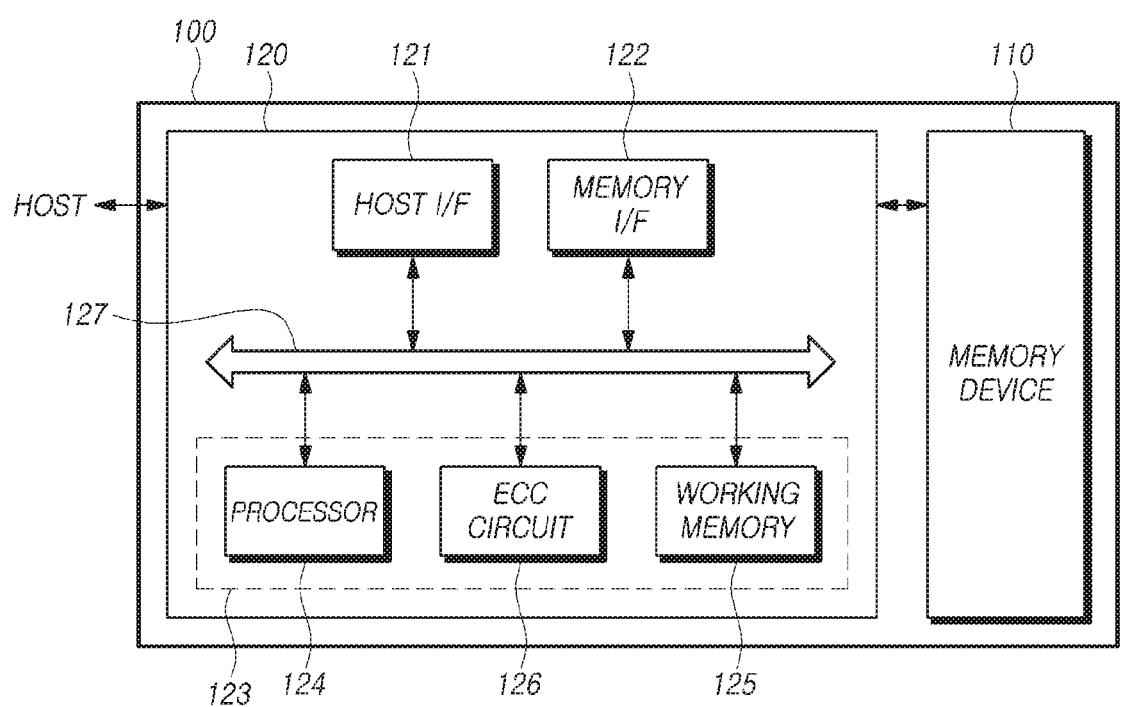
FIG. 1 is a configuration diagram illustrating an example of a memory system in accordance with an embodiment of the disclosure.

FIG. 1 is a configuration diagram illustrating an example of a memory system 100 in accordance with embodiments of the disclosure.

Referring to FIG. 1, the memory system 100 in accordance with an embodiment of the disclosure may include a memory device 110 which stores data, and a memory controller 120 which controls the memory device 110.

The memory device 110 includes a plurality of memory blocks, and operates in response to the control of the memory controller 120. Operations of the memory device 110 may include, for example, a read operation, a program operation (also referred to as a write operation) and an erase operation.

The memory device 110 may include a memory cell array including a plurality of memory cells (also simply referred to as "cells") which store data. Such a memory cell array may exist in memory blocks.

For example, the memory device 110 may be at least one of various types of memory devices such as, a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a vertical NAND flash memory, a NOR flash memory, a resistive random access memory (RRAM), a phase-change memory (PRAM), a magneto-resistive random access memory (MRAM), a ferroelectric random access memory (FRAM) and/or a spin transfer torque random access memory (STT-RAM).

The memory device 110 may be a three-dimensional array structure. An embodiment of the disclosure may be applied to not only a flash memory device in which a charge storage layer includes a conductive floating gate but also a charge trap flash (CTF) memory device in which a charge storage layer includes a dielectric layer.

The memory device 110 is configured to receive a command, an address, and so forth, which are transmitted from the memory controller 120. The memory device 110 is configured to access a region in the memory cell array which is selected by the address. In other words, the memory device 110 may perform an operation corresponding to the command for the region selected by the address.

For example, the memory device 110 may perform a program operation, a read operation, and an erase operation. In the program operation, the memory device 110 may program data in a region selected by the address. In the read operation, the memory device 110 may read data from a region selected by the address. In the erase operation, the memory device 110 may erase data stored in a region selected by the address.

The memory controller 120 may control (program), read, erase and background operations for the memory device 110. For example, the background operation may include at least one of a garbage collection (GC) operation, a wear leveling (WL) operation, a bad block management (BBM) operation, and so forth.

The memory controller 120 may control an operation performed within the memory device 110 according to a request inputted from a host. Further, the memory controller 120 may independently control the background operation performed within the memory device 110, regardless of a request inputted from the host.

Moreover, the memory controller 120 and the host may be separated from each other, or the memory controller 120 and the host may be integrated into one device. Hereunder, the memory controller 120 and the host will be described as being separated from each other.

Referring to FIG. 1, the memory controller 120 may include a memory interface 122, a control circuit 123 and so forth. The memory controller 120 may further include a host interface 121 and so forth.

The host interface 121 may provide an interface for supporting data communication with the host.

The control circuit 123 may receive the command through the host interface 121 or directly from the host, and then, may perform an operation of processing the received command.

The memory interface 122 is coupled with the memory device 110 and thereby provides an interface for supporting data communication with the memory device 110. That is, the memory interface 122 enables communication between the memory device 110 and the memory controller 120 in response to the control of the control circuit 123.

The control circuit 123 controls operations performed by the memory controller 120 in the memory device 110. For instance, the control circuit 123 may include at least one of a processor 124 and a working memory 125. According to an embodiment, the control circuit 123 may further include an error detection and correction circuit (ECC circuit) 126.

The processor 124 may execute or control operations of the memory controller 120, and may perform a logic calculation. The processor 124 may communicate with the host through the host interface 121. The processor 124 may communicate with the memory device 110 through the memory interface 122.

The processor 124 may perform the function of a flash translation layer (FTL). The processor 124 may translate a logical block address (LBA) provided by the host into a physical block address (PBA) through the flash translation layer (FTL). The flash translation layer (FTL) may receive the logical block address (LBA) and translate the received logical block address (LBA) into the physical block address (PBA), based on a mapping table.

There are various address mapping methods of the flash translation layer, depending on a mapping unit. Representative address mapping methods may include a page mapping method, a block mapping method and a hybrid mapping method.

The processor 124 is configured to randomize data received from the host. For example, the processor 124 may randomize data received from the host by using a randomizing seed. Randomized data may be stored in the memory device 110.

The processor 124 is configured to derandomize data, received from the memory device 110, in a read operation. For example, the processor 124 may derandomize data received from the memory device 110 by using a derandomizing seed. Derandomized data may be outputted to the host.

The processor 124 may execute firmware to control the operation of the memory controller 120. In order to control operations of the memory controller 120 and perform a logic calculation, the processor 124 may execute (drive) the firmware loaded to the working memory 125 during a booting procedure.

The firmware is a program to be executed in the memory system 100 and may include various functional layers.

For example, the firmware may include at least one of a flash translation layer (FTL), a host interface layer (HIL), a flash interface layer (FIL), and so forth. The flash translation layer (FTL) performs a translating function between a logical address inputted from the host and a physical address used in the memory device 110. The host interface layer (HIL) serves to analyze a command, inputted from the host, for recognizing a request to the memory system 100 as a storage device and transfers the command to the flash translation layer (FTL). The flash interface layer (FIL) transfers a command delivered from the flash translation layer (FTL) to the memory device 110.

For instance, such firmware may be stored in the memory device 110 and then loaded to the working memory 125.

The working memory 125 may store firmware, a program code, a command and data which are necessary to drive the memory controller 120. The working memory 125, for example, as a volatile memory, may include at least one among an SRAM (static RAM), a DRAM (dynamic RAM) and an SDRAM (synchronous DRAM).

The error detection and correction circuit 126 may be configured to detect an error bit in target data and correct detected error bit by using an error correction code. The target data may be, for example, data stored in the working memory 125, data read from the memory device 110, or the like.

The error detection and correction circuit 126 may decode data by using an error correction code. The error detection and correction circuit 126 may be implemented with at least one of various code decoders. For example, a decoder may perform unsystematic code decoding or systematic code decoding.

For example, the error detection and correction circuit 126 may detect an error bit for each read data, in a unit of a sector. Each read data may be constituted by a plurality of sectors. A sector may mean a data unit smaller than a page as a read unit of a flash memory. The sector may be associated with an address.

The error detection and correction circuit 126 may calculate a bit error rate (BER), and determine whether an error is correctable, in the unit of sector. For example, when a bit error rate (BER) is higher than a reference value, the error detection and correction circuit 126 may determine that data associated with a corresponding sector is uncorrectable and the corresponding read operation fails. On the other hand, when a bit error rate (BER) is lower than the reference value, the error detection and correction circuit 126 may determine that data associated with a corresponding sector is correctable and the corresponding read operation succeeds.

The error detection and correction circuit 126 may perform an error detection and correction operation for all read data. When a sector (sector is sub-unit of read data) is correctable, the error detection and correction circuit 126 may omit an error detection and correction operation for a corresponding sector for next read data. When the error detection and correction operation for all read data is completed, the error detection and correction circuit 126 may detect a sector, which is determined to be uncorrectable. There may be one or more sectors that are determined to be uncorrectable. The error detection and correction circuit 126 may transfer information (for example, address information) regarding a sector which stores data determined to be uncorrectable, to the processor 124.

A bus 127 may be configured to provide channels among the components 121, 122, 124, 125, 126 of the memory controller 120. The bus 127 may include, for example, a control bus for transferring various control signals, commands and the like, a data bus for transferring various data, and so forth.

The above-described components 121, 122, 124, 125, 126 of the memory controller 120 are for an illustration purpose only. Some of the above-described components 121, 122, 124, 125, 126 of the memory controller 120 may be omitted, or some of the above-described components 121, 122, 124, 125, 126 of the memory controller 120 may be integrated into one component. As the case may be, in addition to the above-described components 121, 122, 124, 125, 126 of the memory controller 120, at least one other component may be added.

Hereinbelow, the memory device 110 will be described in further detail with reference to FIG. 2.

Figure 2:
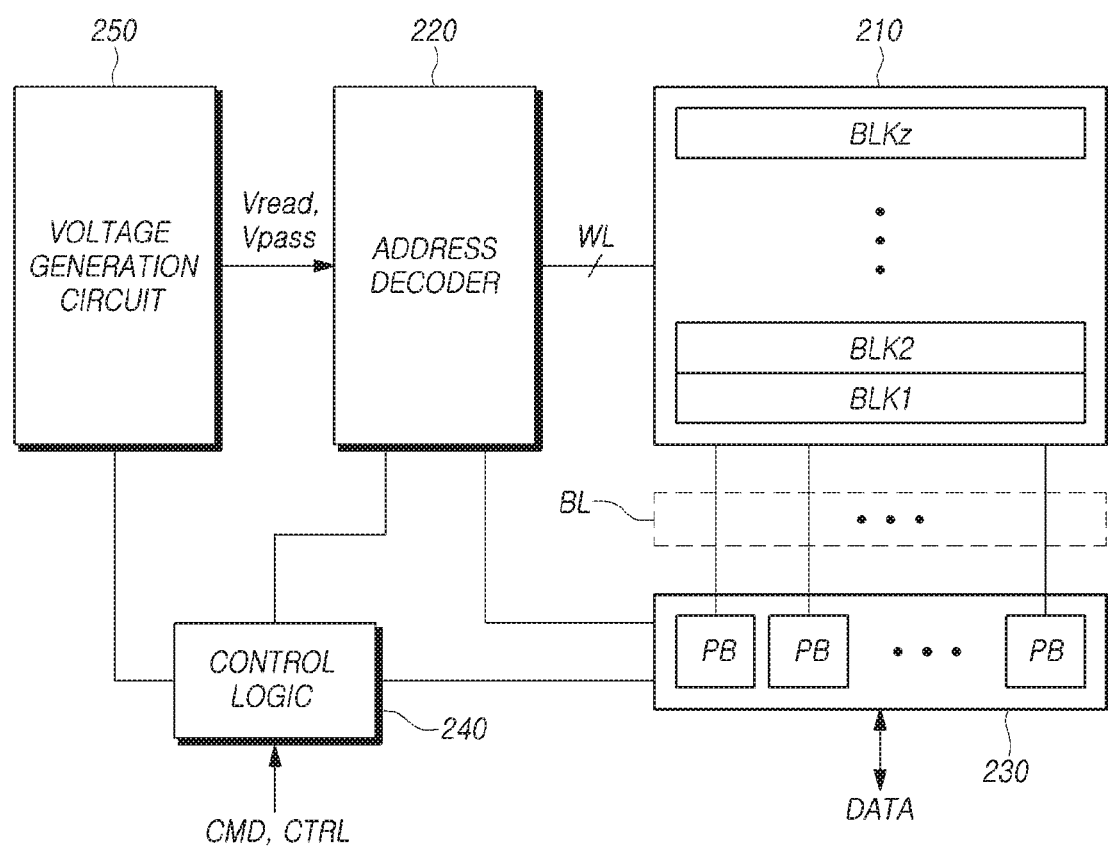
FIG. 2 is a block diagram illustrating an example of a memory device in accordance with an embodiment of the disclosure.

FIG. 2 is a block diagram illustrating an example of the memory device 110 in accordance with an embodiment of the disclosure.

Referring to FIG. 2, the memory device 110 in accordance with an embodiment may include a memory cell array 210, an address decoder 220, a read and write circuit 230, a control logic 240, and a voltage generation circuit 250.

The memory cell array 210 may include a plurality of memory blocks BLK1 to BLKz, where z is a natural number of 2 or greater.

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells. The nonvolatile memory cells may have a vertical channel structure.

The memory cell array 210 may be configured by a memory cell array of a two-dimensional structure, or as the case may be, may be configured by a memory cell array of a three-dimensional structure.

Each of the plurality of memory cells included in the memory cell array 210 may store at least 1-bit data. For instance, each of the plurality of memory cells included in the memory cell array 210 may be a signal level cell (SLC) which stores 1-bit data. For another instance, each of the plurality of memory cells included in the memory cell array 210 may be a multi-level cell (MLC) which stores 2-bit data. For still another instance, each of the plurality of memory cells included in the memory cell array 210 may be a triple level cell (TLC) which stores 3-bit data. For yet another instance, each of the plurality of memory cells included in the memory cell array 210 may be a quad level cell (QLC) which stores 4-bit data. For still yet another instance, the memory cell array 210 may include a plurality of memory cells, each of which stores 5 or more-bit data.

Referring to FIG. 2, the address decoder 220, the read and write circuit 230, the control logic 240, and the voltage generation circuit 250 may control the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory device 110. The address decoder 220 may be configured to decode a block address from the received address. The address decoder 220 may select at least one memory block depending on the decoded block address.

The address decoder 220 may receive a read voltage Vread and a pass voltage Vpass from the voltage generation circuit 250.

In a read voltage applying operation of a read operation, the address decoder 220 may apply the read voltage Vread to a selected word line WL in a selected memory block, and may apply the pass voltage Vpass to the remaining unselected word lines WL.

In a program verify operation, the address decoder 220 may apply a verify voltage generated in the voltage generation circuit 250 to a selected word line WL in a selected memory block, and may apply the pass voltage Vpass to the remaining unselected word lines WL.

The address decoder 220 may be configured to decode a column address from the received address. The address decoder 220 may transmit the decoded column address to the read and write circuit 230.

A read operation and a program operation of the memory device 110 may be performed as a unit of page. An address received when a read operation or a program operation is requested may include at least one of a block address, a row address and a column address.

The address decoder 220 may select one word line of one memory block depending on a block address and a row address. A column address may be decoded by the address decoder 220 and be provided to the read and write circuit 230.

The address decoder 220 may include at least one of a block decoder, a row decoder, a column decoder, and an address buffer.

The read and write circuit 230 may include a plurality of page buffers PB. The read and write circuit 230 may operate as a read circuit during a read operation performed on the memory cell array 210, and may operate as a write circuit in a write operation performed on the memory cell array 210.

The read and write circuit 230 described above may also be referred to as a page buffer circuit or a data register circuit which includes a plurality of page buffers PB. The read and write circuit 230 may include data buffers which are used in a data processing function. According to an embodiment, the read and write circuit 230 may further include cache buffers.

The plurality of page buffers PB may be coupled to the memory cell array 210 through the plurality of bit lines BL. The plurality of page buffers PB may continuously supply a sensing current to bit lines BL coupled with memory cells to sense threshold voltages (Vth) of the memory cells in a read operation or a program verify operation. The plurality of page buffers PB may sense data at sensing nodes, based on changed amounts of current flowing depending on programmed states of the memory cells. The plurality of page buffers PB may latch sensed data.

The read and write circuit 230 may operate in response to page buffer control signals outputted from the control logic 240.

In a read operation, the read and write circuit 230 senses data stored in memory cells and temporarily stores read data. The read and write circuit 230 outputs data DATA to the input/output buffer of the memory device 110. The read and write circuit 230 may include a column select circuit and so forth, as well as the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory device 110.

The control logic 240 may be configured to control general operations of the memory device 110 in response to the control signal CTRL. For example, the control logic 240 may transfer control signals for adjusting precharge potential levels at the sensing nodes coupled with the plurality of page buffers PB.

The control logic 240 may control the read and write circuit 230, to perform a read operation on the memory cell array 210. The voltage generation circuit 250 may generate the read voltage Vread and the pass voltage Vpass supplied for the read operation, in response to a voltage generation circuit control signal outputted from the control logic 240.

Figure 3:
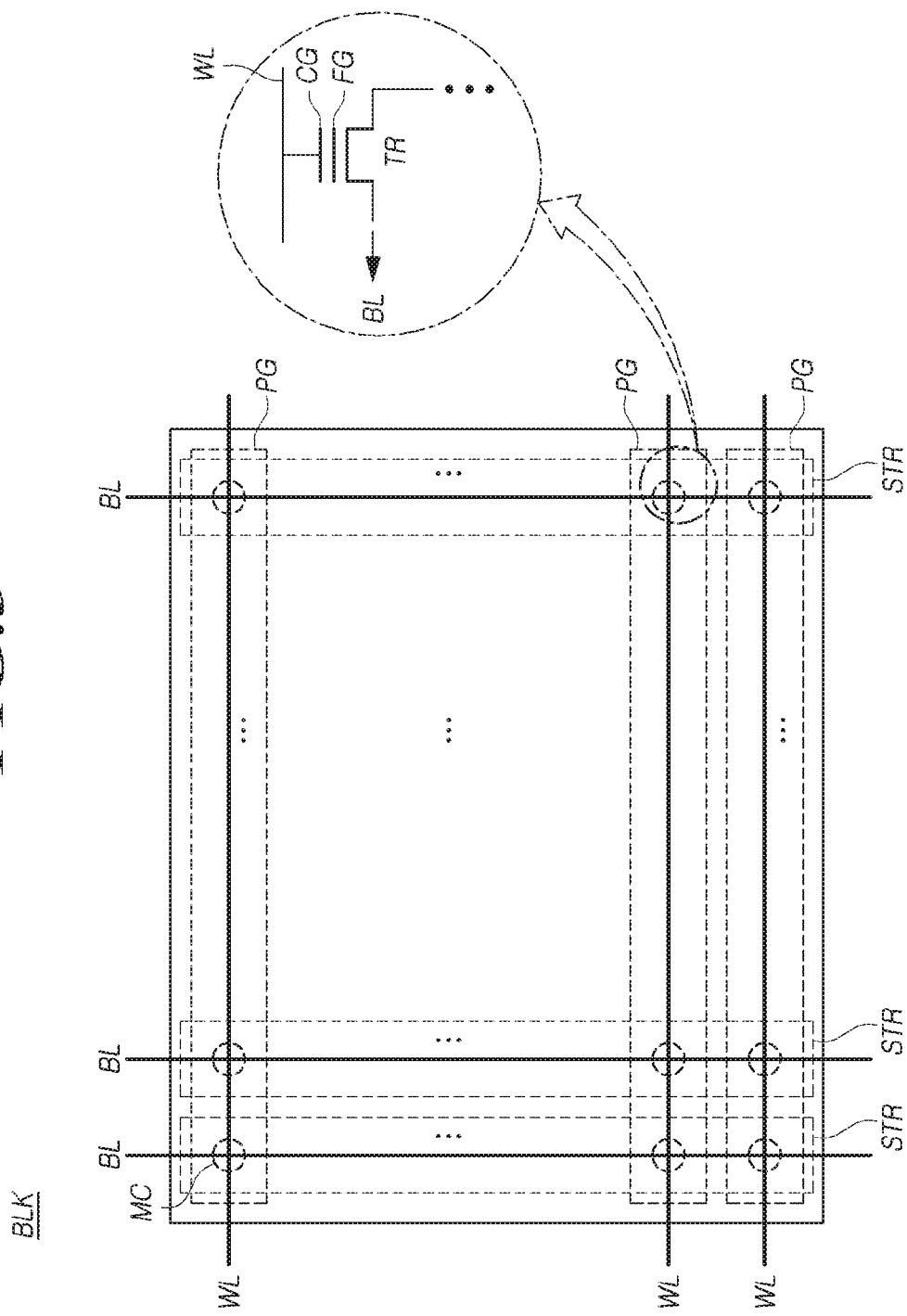
FIG. 3 is a diagram schematically illustrating an example of each memory block of the memory device in accordance with an embodiment of the disclosure.

FIG. 3 is a diagram schematically illustrating an example of each memory block BLK of the memory device 110 in accordance with an embodiment of the disclosure.

Referring to FIG. 3, the memory block BLK included in the memory device 110 may be configured, for example, as a plurality of pages PG and a plurality of strings STR which are disposed in directions intersecting with each other.

The plurality of pages PG correspond to a plurality of word lines WL. The plurality of strings STR correspond to a plurality of bit lines BL.

In the memory block BLK, the plurality of word lines WL and the plurality of bit lines BL may be disposed to intersect each other. For example, each of the plurality of word lines WL may be disposed in a row direction, and each of the plurality of bit lines BL may be disposed in a column direction. For another example, each of the plurality of word lines WL may be disposed in a column direction, and each of the plurality of bit lines BL may be disposed in a row direction.

When the plurality of word lines WL and the plurality of bit lines BL intersect each other, a plurality of memory cells MC may be defined. A transistor TR may be disposed in each memory cell MC.

For example, the transistor TR disposed in each memory cell MC may include a drain, a source and a gate. The drain (or source) of the transistor TR may be coupled with a corresponding bit line BL directly or via another transistor TR. The source (or drain) of the transistor TR may be coupled with a source line which may be the ground, directly or via another transistor TR. The gate of the transistor TR may include a floating gate FG which is surrounded by a dielectric and a control gate CG to which a gate voltage is applied from a word line WL.

In each of the plurality of memory blocks BLK1 to BLKz, a first select line, also referred to as a source select line or a drain select line, may be additionally disposed outside a first outermost word line most adjacent to the read and write circuit 230 between two outermost word lines, and a second select line, also referred to as a drain select line or a source select line, may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

When the memory device 110 has a memory block structure as illustrated in FIG. 3, a read operation and a program operation (write operation) may be performed on a page basis, and an erase operation may be performed on a memory block basis.

Figure 4:
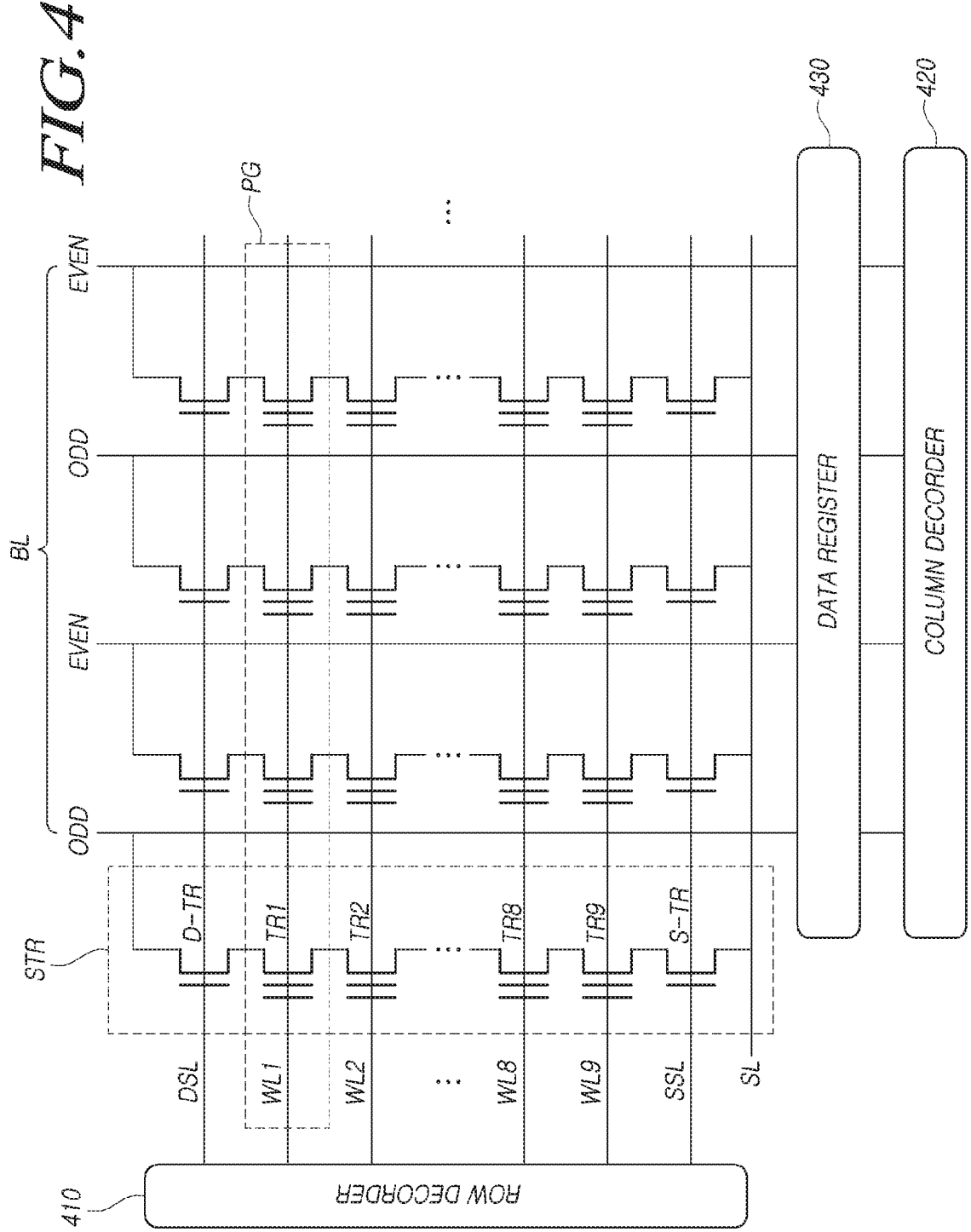
FIG. 4 is a diagram illustrating an example of a structure of word lines and bit lines of the memory device in accordance with an embodiment of the disclosure.

FIG. 4 is a diagram illustrating an example of a structure of word lines WL and bit lines BL of the memory device 110 in accordance with an embodiment of the disclosure.

Referring to FIG. 4, in the memory device 110, there is a core area in which memory cells MC are gathered, and an auxiliary area which corresponds to the remaining area except the core area and which supports the operation of the memory cell array 210.

The core area may be configured by pages PG and strings STR. In the core area, a plurality of word lines WL1 to WL9 and a plurality of bit lines BL are disposed to intersect each other.

The plurality of word lines WL1 to WL9 may be coupled with a row decoder 410, and the plurality of bit lines BL may be coupled with a column decoder 420. A data register 430 corresponding to the read and write circuit 230 may exist between the plurality of bit lines BL and the column decoder 420.

The plurality of word lines WL1 to WL9 correspond to a plurality of pages PG.

For example, as illustrated in FIG. 4, each of the plurality of word lines WL1 to WL9 may correspond to one page PG. In the case where the size of each of the plurality of word lines WL1 to WL9 is large, each of the plurality of word lines WL1 to WL9 may correspond to at least two (for example, two or four) pages PG. Page PG may be a minimum unit for performing a program operation and a read operation. In the program operation and the read operation, all memory cells MC in the same page PG may be read or programmed together.

The plurality of bit lines BL may be coupled with the column decoder 420 while being identified as odd-numbered bit lines BL and even-numbered bit lines BL.

To access memory cells MC, first, an address may be entered into the core area through the row decoder 410 and the column decoder 420 via an input/output terminal, and may designate target memory cells. Designating target memory cells means accessing memory cells MC positioned at sites where the word lines WL1 to WL9 coupled with the row decoder 410 and the bit lines BL coupled with the column decoder 420 intersect; each other, to program data to the memory cells MC or read out programmed data from the memory cells MC.

A plurality of memory cells, considered a page PG in a first direction (e.g., an X-axis direction), is bundled (coupled) by a common line which is referred to as a word line WL. A plurality of memory cells constituting a string STR in a second direction (e.g., a Y-axis direction) is bundled (coupled) by a common line which is referred to as a bit line BL. Being bundled in common means that corresponding memory cells MC are structurally coupled with one another by the same material or the same structural element and the same voltage is simultaneously applied to the memory cells MC through the same material or the same structure element. Because memory cells MC which are coupled in series, a specific memory cell positioned at an intermediate position or a last position may be influenced by a voltage drop caused by a resistance of the same structure element or a preceding memory cell MC, so that levels of voltage applied to a first memory cell MC and a last memory cell MC may be slightly different from each other.

Data is programmed and read via the data register 430 during data input/output (I/O) operations of the memory device 110. When processing data in the data register 430 is delayed, other components may have to wait until the data register 430 transfers the data. When performance of the data register 430 is degraded, the overall performance of the memory device 110 may be degraded.

Referring to the illustration of FIG. 4, one string STR may include a plurality of transistors TR1 to TR9 which are independently coupled with different word lines, i.e., the plurality of word lines WL1 to WL9. Each of the plurality of transistors TR1 to TR9 may correspond to each of memory cells MC. The plurality of transistors TR1 to TR9 can individually include a control gate CG and a floating gate FG as described above.

The plurality of word lines WL1 to WL9 may include two outermost word lines WL1 and WL9. A first select line DSL may be additionally disposed outside a first outermost word line WL1 which is most adjacent to the data register 430 in terms of signal path between the two outermost word lines WL1 and WL9. A second select line SSL may be additionally disposed outside a second outermost word line WL9 between the two outermost word lines WL1 and WL9.

A first select transistor D-TR which is turned on or off by the first select line DSL has a gate electrode coupled with the first select line DSL. The first select transistor D-TR does not include a floating gate FG. A second select transistor S-TR which is turned on or off by the second select line SSL has a gate electrode coupled with the second select line SSL. The second select transistor S-TR does not include a floating gate FG.

The first select transistor D-TR serves as a switch which turns on or off the coupling between a corresponding string STR and the data register 430. The second select transistor S-TR serves as a switch which turns on or off the coupling between the corresponding string STR and a source line SL. The first select transistor D-TR and the second select transistor S-TR, positioned at both ends of the corresponding string STR, may serve as gatekeepers which couple and decouple signals.

To trap electrons in a target memory cell MC coupled via a bit line BL in a program operation, the memory system 100 can supply a predetermined turn-on voltage Vcc to the gate electrode of the first select transistor D-TR to turn on the first select transistor D-TR, and supply a predetermined turn-off voltage (e.g., 0V) to the gate electrode of the second select transistor S-TR to turn off the second select transistor S-TR.

In a read operation or a verify operation, the memory system 100 turns on both the first select transistor D-TR and the second select transistor S-TR. A current may be flowed into the source line SL corresponding to the ground through the corresponding string STR, so that a voltage level of the bit line BL may be measured. In the read operation, there may be a difference between on/off timings of the first select transistor D-TR and the second select transistor S-TR.

In an erase operation, the memory system 100 may supply a predetermined voltage (e.g., +20V) to a substrate through the source line SL. In the erase operation, the memory system 100 floats both the first select transistor D-TR and the second select transistor S-TR, thereby providing infinite resistance. Accordingly, the first select transistor D-TR and the second select transistor S-TR do not work. Electrons may move according to a potential difference between a floating gate FG and the substrate.

Figure 5:
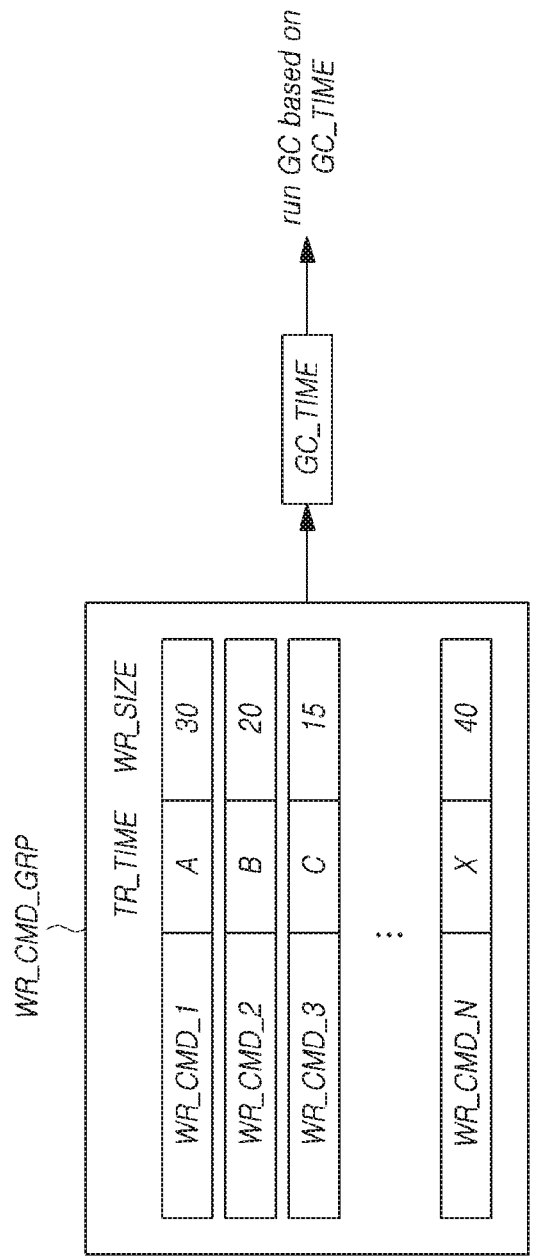
FIG. 5 is a diagram illustrating an example of a schematic structure for determining an execution time of garbage collection in the memory system in accordance with an embodiment of the disclosure.

FIG. 5 illustrates an example of how to determine an execution time of garbage collection in the memory system 100 in accordance with an embodiment of the disclosure.

The memory controller 120 included in the memory system 100 may determine a time GC_TIME for performing garbage collection, based on the information of a write command group WR_CMD_GRP including at least one write command received from the host.

The information of the write command group WR_CMD_GRP may include, for each write command WR_CMD_1, WR_CMD_2, WR_CMD_3, . . . , WR_CMD_N included in the write command group WR_CMD_GRP, where N is a natural number, transmission time information TR_TIME indicating a time point at which the host transmits the write command and write size information WR_SIZE indicating a write data size of the write command.

In a following embodiment, transmission time information TR_TIME may be represented by A, B, C, . . . , and the value of each transmission time information TR_TIME may correspond to a specific time value. For example, the transmission time information TR_TIME B may correspond to 2019/05/07 13:11:12, and the transmission time information TR_TIME C may correspond to 2019/05/07 13:11:14.

Further, in a following embodiment, the write size information WR_SIZE may be represented by a specific numerical value, and a unit of the write size information WR_SIZE may vary. For example, the unit of the write size information WR_SIZE may be a page (4 KB or 8 KB).

For example, in the case of the write command WR_CMD_1, the transmission time information TR_TIME may be A, and the write size information WR_SIZE may be 30. In the case of the write command WR_CMD_2, the transmission time information TR_TIME may be B, and the write size information WR_SIZE may be 20. In the case of the write command WR_CMD_3, the transmission time information TR_TIME may be C, and the write size information WR_SIZE may be 15. In the case of the write command WR_CMD_N, the transmission time information TR_TIME may be X, and the write size information WR_SIZE may be 40.

The memory controller 120 may dynamically determine the time GC_TIME for performing garbage collection, based on the above-described information of the write command group WR_CMD_GRP.

The memory controller 120 may execute garbage collection based on the determined time GC_TIME. As the time GC_TIME becomes longer, the number of free blocks secured through the garbage collection may be increased.

Where the memory controller 120 determines the time GC_TIME for performing garbage collection, based on the information of the write command group WR_CMD_GRP, the memory system 100 can have an advantage as follows.

In general, a time for garbage collection may be determined depending on the number of free memory blocks included in the memory device 110. The free memory block is a type of memory block which can be allocated for a next program operation.

For example, when the number of free memory blocks is equal to or less than a preset threshold, the memory controller 120 may execute garbage collection to secure free memory blocks. In this case, a time for performing garbage collection may be changed depending on the number of free memory blocks.

However, when the memory controller 120 determines a time for garbage collection, based on the number of free memory blocks only, a performance issue may be caused when the host requests a write operation with a large amount of data.

Specifically, when the host continuously transmits plural write commands with a large amount of data for a short time, garbage collection may be executed because the number of free memory blocks rapidly decreases.

In general, the memory controller 120 executes garbage collection when the memory system 100 is in an idle state in which a command received from the host is not being processed, to avoid aggravating performance. However, if, as described above, a large amount of write commands are transmitted from the host, the memory controller 120 may not enter an idle state because the memory controller 120 needs to process the corresponding write commands. Thus, the memory controller 120 executes garbage collection while processing the commands received from the host.

When an internal write operation is executed in the memory device 110 due to garbage collection, a time for processing the write commands received from the host may be delayed. However, because garbage collection is independently performed within the memory system 100, the host positioned outside the memory system 100 cannot determine whether garbage collection is being executed. Therefore, it is highly likely that the host determines that the processing of a write command is delayed not because of garbage collection but because of degradation in write performance of the memory system 100.

Hence, to avoid such a problem and maintain the write performance as stably as possible, a time for garbage collection may be dynamically changed depending on a workload caused by a write command inputted from the host.

For example, when the number of write commands inputted from the host for a predetermined time is less than a preset value, that is, when a workload is light, the memory controller 120 may increase the time GC_TIME for performing garbage collection because a delay might not be critical and it is highly possible that the host may not experience degradation in write performance due to garbage collection. Through this, the memory controller 120 may secure free memory blocks in advance while reducing degradation in write performance.

On the other hand, when the number of write commands inputted from the host for a predetermined time is greater than, or equal to, the preset value, that is, when a workload is heavy, the memory controller 120 may decrease the time GC_TIME for performing garbage collection because the delay might be critical and it is highly possible that the host may experience degradation in write performance due to garbage collection. Through this, the memory controller 120 may minimize degradation in write performance that is recognized by the host.

When a time for garbage collection is dynamically determined depending on a workload, it is necessary that the workload be accurately estimated or predicted, to ensure that write performance is maintained as stably as possible.

Therefore, it is important for the memory controller 120 to accurately estimate or predict a workload.

In order to estimate or predict a workload as accurately as possible, the memory controller 120 may analyze and utilize a workload corresponding to a plurality of write commands for workload prediction, rather than analyzing a single write command.

When analyzing a workload corresponding to only a single write command, the memory controller 120 may only determine a workload at a specific time point or under a specific circumstance/environment, thus the memory controller 120 cannot accurately determine history information for predicting a change in workload.

For example, when the host temporarily transmits a write command requesting a write of a large amount of data and no longer transmits a write command thereafter, if the memory controller 120 predicts a workload by using only the corresponding write command, a workload may be predicted to be heavier than an actual workload. Furthermore, if the memory controller 120 tries to determine a pattern in which the host transmits write commands for a predetermined time and only a single command is received in the predetermined time, the memory controller may estimate or predict a workload to be lighter, since the memory controller will predict that the host will no longer transmit another write command.

Thus, in an embodiment of the disclosure, the memory controller 120 may advantageously determine the time GC_TIME for garbage collection, based on information for the write command group WR_CMD_GRP which includes a plurality of write commands.

The write command group WR_CMD_GRP for determining the time GC_TIME for garbage collection may be variously determined. Hereinafter, an example of a method in which the write command group WR_CMD_GRP is determined will be described with reference to FIG. 6.

Figure 6:
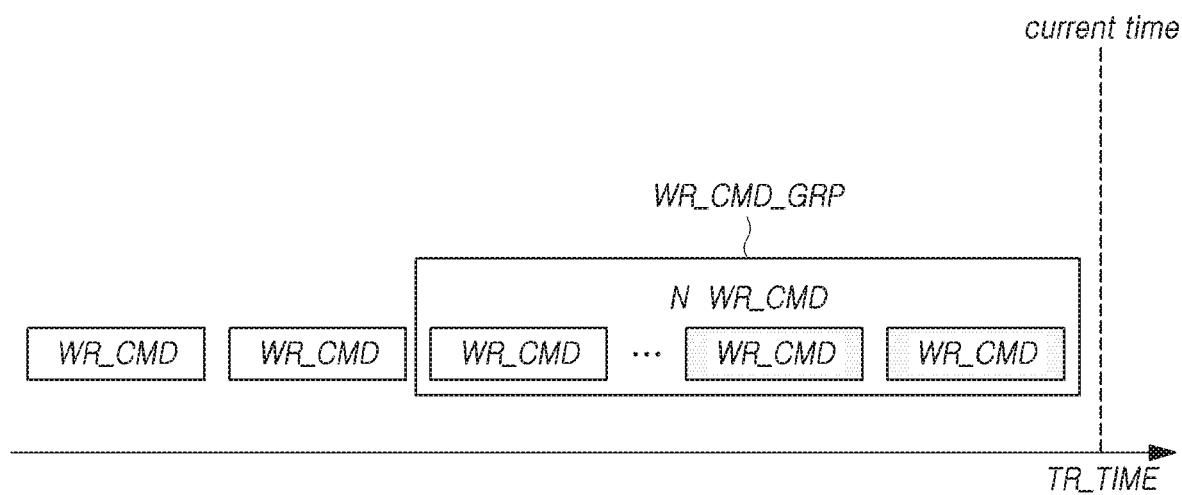
FIG. 6 describes a method of selecting a write command group in the memory system in accordance with an embodiment of the disclosure.

FIG. 6 is an example of a method for selecting the write command group WR_CMD_GRP in the memory system 100 in accordance with an embodiment of the disclosure.

Referring to FIG. 6, the write command group WR_CMD_GRP may include N number of write commands WR_CMD which are most recently transmitted by the host, where N is a natural number.

The memory controller 120 may include, in the write command group WR_CMD_GRP, N number of write commands transmitted by the host which have a smallest difference between the transmission time information TR_TIME of write commands and a current time.

A reason why the memory controller 120 includes only the recently transmitted write commands in the write command group WR_CMD_GRP is that the older the commands inputted from the host are, the less likely those commands reflect current workload changes.

In order for the memory controller 120 to accurately determine N number of write commands WR_CMD most recently transmitted by the host, where N is a natural number, the transmission time information TR_TIME of each write command needs to be accurately determined.

Figure 7:
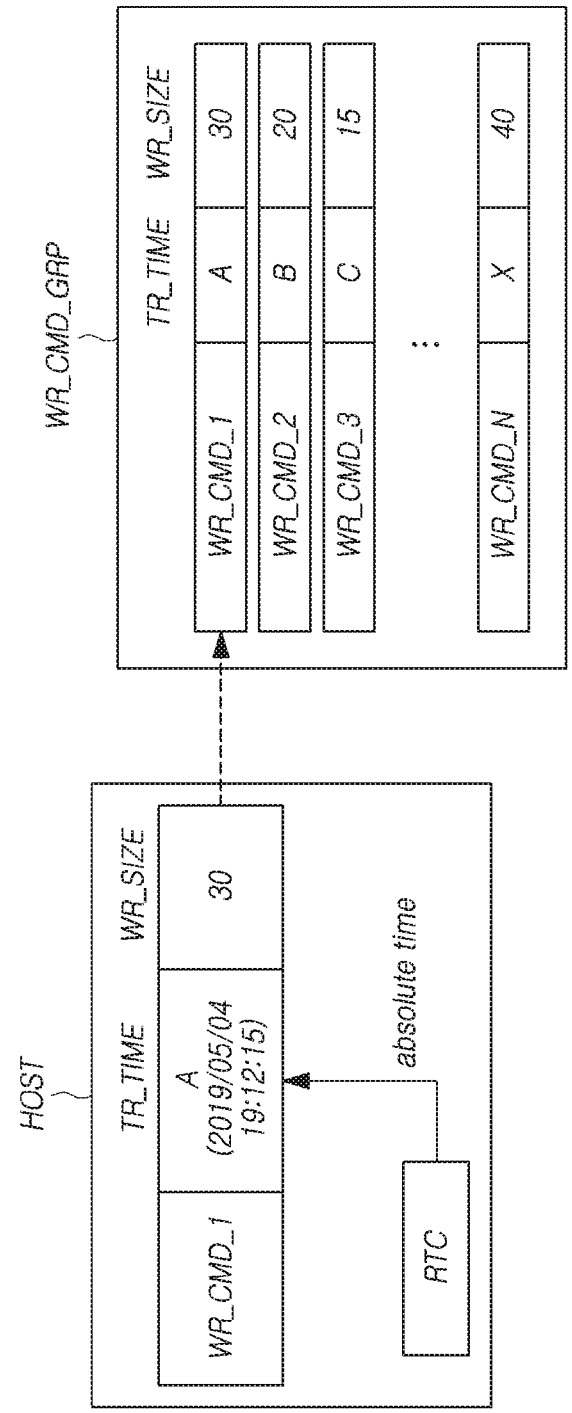
FIG. 7 describes a method of determining transmission time information for each write command in the memory system in accordance with an embodiment of the disclosure.

FIG. 7 shows an example of a method of determining the transmission time information TR_TIME for each write command in the memory system 100 in accordance with an embodiment of the disclosure.

Referring to FIG. 7, the transmission time information TR_TIME for each of the write commands WR_CMD_1, WR_CMD_2, WR_CMD_3, . . . , WR_CMD_N included in the write command group WR_CMD_GRP may be absolute time information generated by the host.

For example, when the host transmits the write command WR_CMD_1 to the memory controller 120, the host may transmit the write command WR_CMD_1 by including, in the write command WR_CMD_1, an absolute time A (e.g., 2019/05/04 19:12:15) calculated through a real time clock (RTC) included in the host.

The RTC is a module which provides absolute time information and may calculate absolute time information without the intervention of a separate processor from the outside. The RTC may include a circuit which counts a date and an hour/minute/second and an oscillator for generating a clock used in the circuit.

An RTC circuit may calculate time information even in a state in which power is not supplied to the host. The RTC circuit may include a separate battery for supplying power to the circuit which counts a time.

When the memory controller 120 receives the write command WR_CMD_1 from the host, the memory controller 120 may include the write command WR_CMD_1 in the write command group WR_CMD_GRP. This operation method may be similarly applied to the other write commands WR_CMD_2, WR_CMD_3, ..., WR_CMD_N.

A reason why the transmission time information TR_TIME for each of the write commands WR_CMD_1, WR_CMD_2, WR_CMD_3, ..., WR_CMD_N included in the write command group WR_CMD_GRP is not composed of relative time information but is composed of absolute time information is as follows.

In a case where a power-down occurs (power is interrupted) or a command is not inputted from the host for a predetermined time, the memory system 100 may be deactivated to reduce power consumption (e.g., hibernation).

Therefore, in the case where the memory system 100 uses relative time information managed internally, if the memory system 100 is deactivated as described above, the memory system 100 cannot reflect a deactivation time.

In other words, when the memory system 100 uses relative time information managed internally, the memory system 100 may not reflect a time which has passed for the above-described deactivation time. However, the above-described deactivation time needs to be reflected in the calculation of a workload, as a time during which no write command is transmitted from the host.

Therefore, when the memory system 100 uses the relative time information managed internally, the accuracy of the transmission time information TR_TIME for each of the write commands WR_CMD_1, WR_CMD_2, WR_CMD_3, ..., WR_CMD_N may be lowered.

Therefore, when the host is capable of accurately measuring an absolute time and generates the transmission time information TR_TIME based on the absolute time, the accuracy of the transmission time information TR_TIME for each of the write commands WR_CMD_1, WR_CMD_2, WR_CMD_3, ..., WR_CMD_N may be increased.

Figure 8:
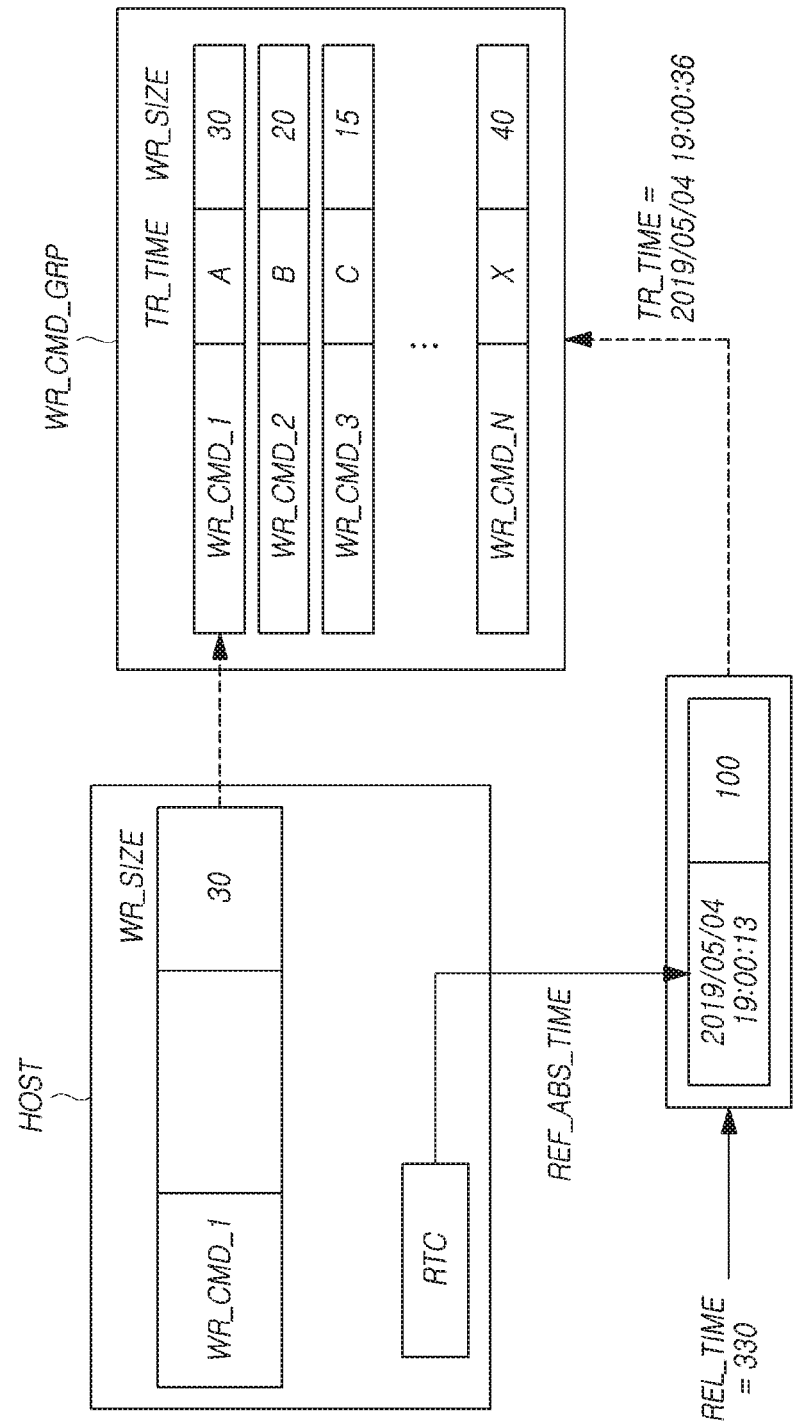
FIG. 8 illustrates a method of determining transmission time information for each write command in the memory system in accordance with an embodiment of the disclosure.

FIG. 8 describes another example of a method of determining transmission time information for each write command in the memory system in accordance with an embodiment of the disclosure.

Referring to FIG. 8, instead of being directly generated in the host, the transmission time information TR_TIME may be generated based on a result value obtained by synchronizing relative time information REL_TIME with reference absolute time information REF_ABS_TIME.

The reference absolute time information REF_ABS_TIME may be generated by the host. For example, the reference absolute time information REF_ABS_TIME may be generated by an RTC circuit included in the host.

The memory controller 120 may receive the reference absolute time information REF_ABS_TIME generated by the host.

A time point at which the memory controller 120 receives the reference absolute time information REF_ABS_TIME from the host may be variously determined. For example, the memory controller 120 may receive the reference absolute time information REF_ABS_TIME at every predetermined period. As another example, the memory controller 120 may receive the reference absolute time information REF_ABS_TIME when waking up from a sleep mode.

The memory controller 120 may synchronize the relative time information REL_TIME with the reference absolute time information REF_ABS_TIME as described above.

The relative time information REL_TIME may be generated in the memory controller 120 or in a separate module (e.g., an oscillator) outside the memory controller 120.

The relative time information REL_TIME may be initialized when the memory controller 120 is powered down or enters the sleep mode.

The format of the relative time information REL_TIME may be determined in various ways. For example, the relative time information REL_TIME may be a count value that increases every predetermined time interval (e.g., 1 ms).

Hereinafter, an example in which the memory controller 120 determines the transmission time information TR_TIME for each write command by synchronizing the relative time information REL_TIME with the reference absolute time information REF_ABS_TIME will be described.

The memory controller 120 may receive reference absolute time information REF_ABS_TIME 2019/05/04 19:00:13 from the host after booting. Further, in FIG. 8 the value of the relative time information REL_TIME when the memory controller 120 receives the reference absolute time information REF_ABS_TIME is 100 and the relative time information REL_TIME is a count value that increases by 1 every 0.1 second.

In this case, the memory controller 120 synchronizes the value 2019/05/04 19:00:13 of the reference absolute time information REF_ABS_TIME and the value 100 of the relative time information REL_TIME.

In FIG. 8, the relative time information REL_TIME at a time point when the write command WR_CMD_1 is subsequently transmitted from the host is 330. In this case, the memory controller 120 may determine that the write command WR_CMD_1 is transmitted at a time point that has passed by (330−100)*0.1=23 seconds from 2019/05/04 19:00:13 as the value of the reference absolute time information REF_ABS_TIME, that is, at 2019/05/04 19:00:36.

Subsequently, the memory controller 120 enters the sleep mode, wakes up again and then receives new reference absolute time information REF_ABS_TIME 2019/05/04 19:02:31 from the host. Further, when the memory controller 120 receives the reference absolute time information REF_ABS_TIME, the value of the relative time information REL_TIME is 40.

In this case, the memory controller 120 synchronizes the value 2019/05/04 19:02:31 of the new reference absolute time information REF_ABS_TIME with the value 40 of the relative time information REL_TIME.

In FIG. 8, the relative time information REL_TIME at a time point when the write command WR_CMD_2 is subsequently transmitted from the host is 190. In this case, the memory controller 120 may determine that the write command WR_CMD_2 is transmitted at a time point that has passed by (190−40)*0.1=15 seconds from 2019/05/04

19:02:31 as the value of the new reference absolute time information REF_ABS_TIME, that is, at 2019/05/04 19:02:46.

Through the method described above with reference to FIG. 8, even in the case where the host does not calculate absolute times for all write commands, the memory controller 120 may calculate the transmission time information TR_TIME for each write command transmitted by the host.

An embodiment of a method of generating the information of the write command group WR_CMD_GRP has been described with reference to the above-described drawings.

Hereinafter, a data structure in which the memory controller 120 stores the information of the write command group WR_CMD_GRP described above will be described in detail.

Figure 9:
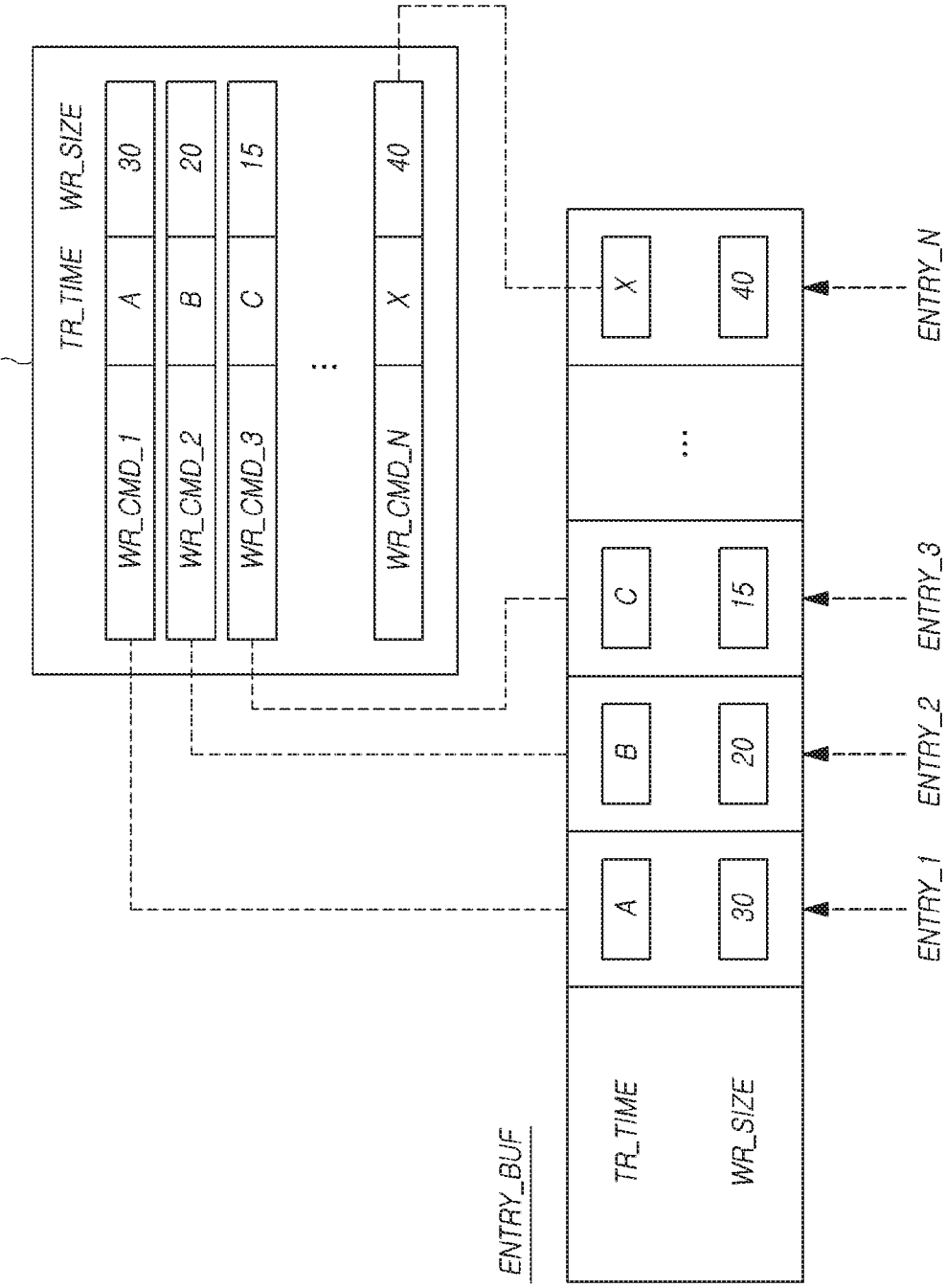
FIG. 9 is a diagram illustrating an example of an entry buffer which stores information of a write command group in the memory system in accordance with an embodiment of the disclosure.

FIG. 9 illustrates an example of an entry buffer ENTRY_BUF which stores the information of the write command group WR_CMD_GRP, in the memory system 100 in accordance with an embodiment of the disclosure.

Referring to FIG. 9, the information of the write command group WR_CMD_GRP may be stored in the entry buffer ENTRY_BUF which includes a plurality of entries. The entry buffer ENTRY_BUF may be stored at various positions. For example, the entry buffer ENTRY_BUF may be stored in the working memory 125 in the memory controller 120.

Each of the plurality of entries included in the entry buffer ENTRY_BUF may include transmission time information TR_TIME and write size information WR_SIZE for a corresponding one of the write commands included in the write command group WR_CMD_GRP.

For instance, in FIG. 9, an entry ENTRY_1 among the plurality of entries stored in the entry buffer ENTRY_BUF includes the transmission time information TR_TIME of A and the write size information WR_SIZE of 30 on the write command WR_CMD_1. An entry ENTRY_2 includes the transmission time information TR_TIME of B and the write size information WR_SIZE of 20 on the write command WR_CMD_2. An entry ENTRY_3 includes the transmission time information TR_TIME of C and the write size information WR_SIZE of 15 on the write command WR_CMD_3. An entry ENTRY_N includes the transmission time information TR_TIME of X and the write size information WR_SIZE of 40 on the write command WR_CMD_N.

The entry buffer ENTRY_BUF described above may be realized in various ways.

Figure 10:
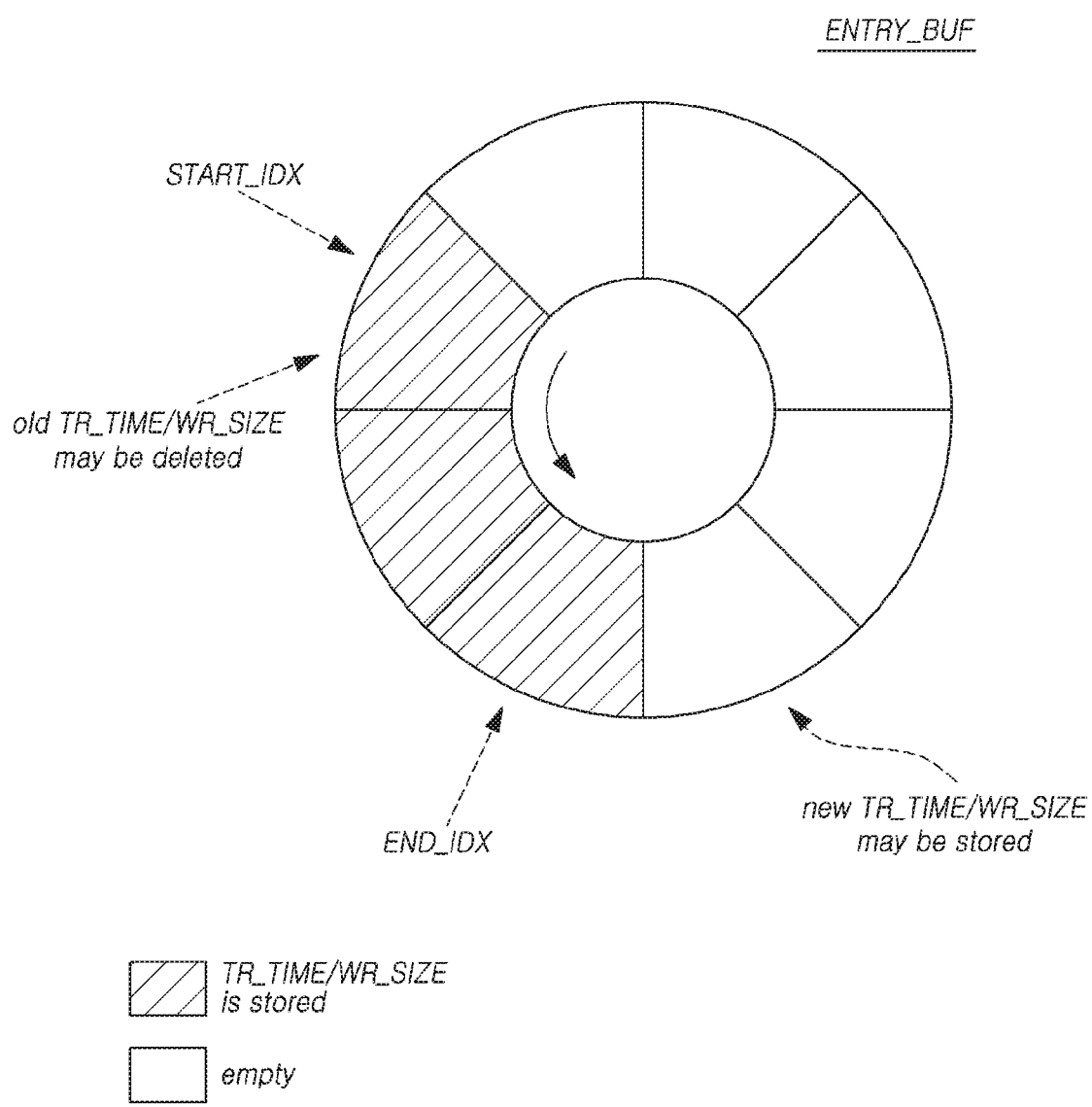
FIGS. 10 and 11 are diagrams illustrating examples of entry buffers each of which stores information of a write command group, in the memory system in accordance with an embodiment of the disclosure.
Figure 11:
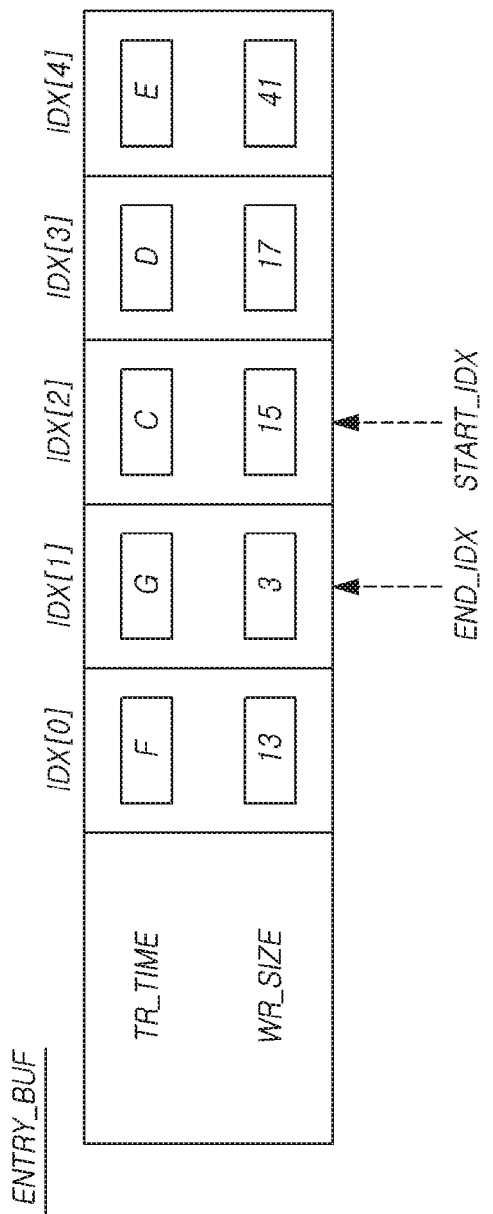

FIGS. 10 and 11 illustrate in detail an example in which the entry buffer ENTRY_BUF is implemented with a circular buffer.

FIGS. 10 and 11 are diagrams illustrating examples of entry buffers ENTRY_BUF each of which stores the information of a write command group, in the memory system 100 in accordance with embodiments of the disclosure.

Referring to FIG. 10, an entry buffer ENTRY_BUF may include a circular buffer.

Among entries included in the entry buffer ENTRY_BUF, each of entries from an entry indicated by a start index START_IDX to an entry indicated by an end index END_IDX includes transmission time information TR_TIME and write size information WR_SIZE for a corresponding write command included in the write command group WR_CMD_GRP. The remaining entries are empty.

In a case where a new write command is added to the write command group WR_CMD_GRP, the transmission time information TR_TIME and the write size information WR_SIZE for the new write command may be stored in an entry which is indicated by an index next to the end index END_IDX. The value of a new end index END_IDX may be the index next to the current end index END_IDX.

In a case where an oldest write command is erased from the write command group WR_CMD_GRP, the transmission time information TR_TIME and the write size information WR_SIZE for an entry which is indicated by the start index START_IDX may be erased. The value of a new start index START_IDX may be an index next to the current start index START_IDX.

In this way, as the transmission time information TR_TIME and the write size information WR_SIZE for the new write command are added to the entry buffer ENTRY_BUF, and the transmission time information TR_TIME and the write size information WR_SIZE for the oldest write command are erased from the entry buffer ENTRY_BUF, the entry buffer ENTRY_BUF may store information on N number of write commands which are most recently transmitted by the host.

FIG. 11 shows an example in which the circular buffer described above with reference to FIG. 10 is implemented with a linear buffer.

In FIG. 11, the entry buffer ENTRY_BUF is a circular buffer constituted by five entries, and indexes of the respective entries are 0, 1, 2, 3 and 4. In order to realize a circular buffer, in the case where the value of a current index is 4, the value of a next index is determined to be not 4+1=5 but 0. In this case, the value of a start index START_IDX may be greater than the value of an end index END_IDX.

Referring to FIG. 11, the value of the start index START_IDX is 2, and the value of the end index END_IDX is 1. At this time, the information of the write command group WR_CMD_GRP is stored in the entry buffer ENTRY_ BUF in the order of the entry indexes 2, 3, 4, 0 and 1.

Namely, the values of the transmission time information TR_TIME and the write data size WR_SIZE of the entire write command group WR_CMD_GRP are {(C, 15), (D, 17), (E, 41), (F, 13), (G, 3)}.

In an embodiment, the configuration of the write command group WR_CMD_GRP and a method in which the information of the write command group WR_CMD_GRP is stored have been described.

Hereinafter, a method of determining the time GC_TIME during which garbage collection is executed, based on the information of the write command group WR_CMD_GRP described above, will be described.

Figure 12:
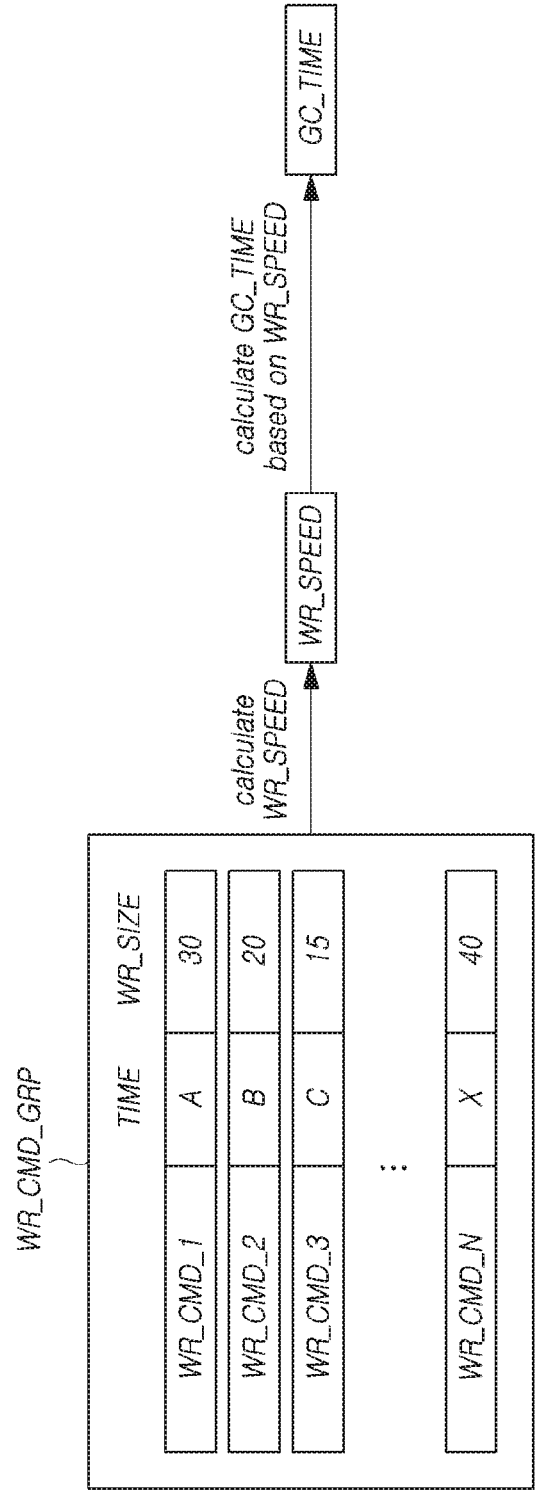
FIG. 12 is a diagram for describing a method of calculating write data speed based on the information of a write command group in accordance with an embodiment of the disclosure.

FIG. 12 describes a method of calculating a write data speed WR_SPEED based on the information of the write command group WR_CMD_GRP in the memory system 100 in accordance with an embodiment of the disclosure.

Referring to FIG. 12, the time GC_TIME for garbage collection may be determined based on the write data speed WR_SPEED which is calculated based on all or a part of the information of the write command group WR_CMD_GRP.

If a current write data speed WR_SPEED is determined, the memory controller 120 may predict a future workload.

For example, if the current write data speed WR_SPEED is fast, the memory controller 120 may determine that a workload will become heavy in the future, because the host is highly likely to continue to transmit write commands.

On the contrary, if a current write data speed WR_SPEED is slow, the memory controller 120 may determine that a workload will become light in the future, because the host is less likely to subsequently transmit write commands.

Furthermore, when the memory controller 120 determines the time GC_TIME during which garbage collection is executed, based on the write data speed WR_SPEED, not only the magnitude of the write data speed WR_SPEED but also a variation in the write data speed WR_SPEED over time may be considered.

As an example, a currently calculated write data speed WR_SPEED is 10. If a previously calculated write data speed WR_SPEED is 8, the memory controller 120 may determine that the write data speed WR_SPEED tends to increase and thus a workload will become heavier in the future. On the other hand, if a previously calculated write data speed WR_SPEED is 12, the memory controller 120 may determine that the write data speed WR_SPEED tends to decrease and thus a workload will become lighter in the future.

Figure 13:
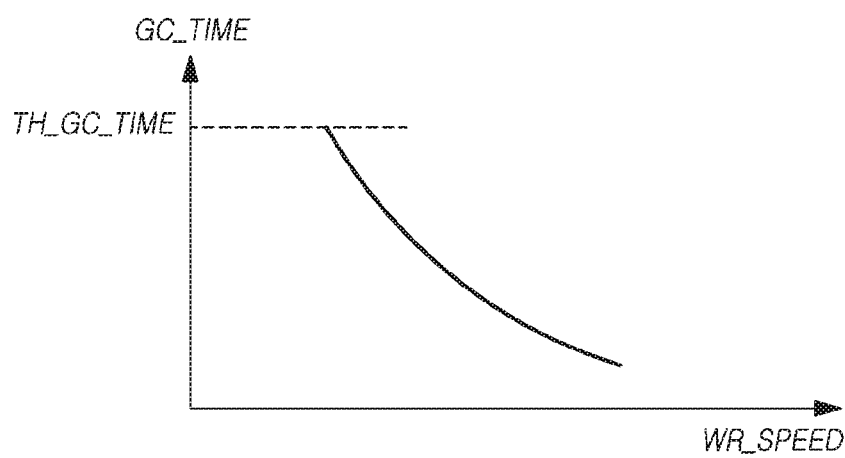
FIG. 13 is a graph for describing the relationship between a write data speed and an execution time of garbage collection in the memory system in accordance with an embodiment of the disclosure.

FIG. 13 is a graph describing the relationship between the write data speed WR_SPEED and the execution time GC_TIME for garbage collection in the memory system 100 in accordance with an embodiment of the disclosure.

Referring to FIG. 13, as the write data speed WR_SPEED becomes faster, the execution time GC_TIME for garbage collection decreases. This is because, as described above with reference to FIG. 6, since a fast write data speed WR_SPEED means that a workload is heavy, it is necessary to reduce the execution time GC_TIME of garbage collection. On the other hand, since a slow write data speed WR_SPEED means that a workload is light, it is necessary to increase the execution time GC_TIME of garbage collection.

The above-described relationship between the execution time GC_TIME of garbage collection and the write data speed WR_SPEED may be expressed by the following Equation 1.

$$GC\_TIME = PC * (1/(WR\_SPEED)) \ (PC: \text{proportional constant value}) \quad \text{[Equation 1]}$$

In the case where the execution time GC_TIME of garbage collection is determined by Equation 1 described above, if the write data speed WR_SPEED approaches 0, the execution time GC_TIME of garbage collection may increase infinitely.

Therefore, the memory controller 120 may reduce the execution time GC_TIME of garbage collection as the write data speed WR_SPEED becomes faster, and may set the execution time GC_TIME of garbage collection to be less than or equal to a preset threshold garbage collection time TH_GC_TIME.

In this case, the relationship between the execution time GC_TIME of garbage collection and the write data speed WR_SPEED may be expressed by the following Equation 2.

$$GC\_TIME = MIN(TH\_GC\_TIME, PC * (1/(WR\_SPEED))) \ (PC: \text{proportional constant value}) \quad \text{[Equation 2]}$$

Hereinafter, a method of calculating the write data speed WR_SPEED described above will be described in detail with reference to FIGS. 14 and 15.

Figure 15:
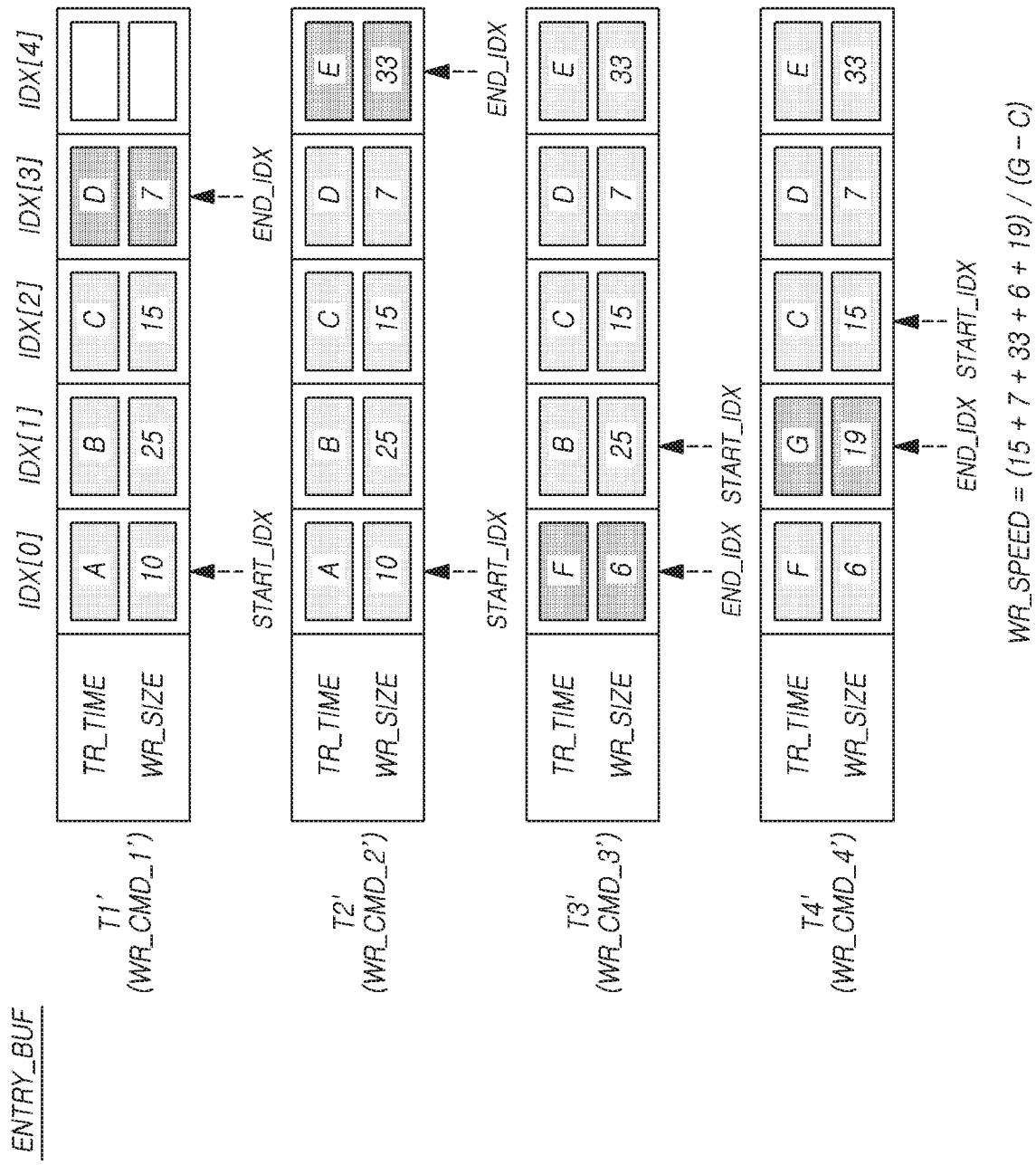

FIGS. 14 and 15 are diagrams for describing a method of calculating the write data speed WR_SPEED in the memory system 100 in accordance with an embodiment of the disclosure.

Referring to FIGS. 14 and 15, the write data speed WR_SPEED may be calculated based on the difference between a maximum value and a minimum value of the transmission time information TR_TIME included in all or a part of the information of the write command group WR_CMD_GRP, and the sum of write data sizes WR_SIZE included in all or the part of the information of the write command group WR_CMD_GRP.

In FIG. 14, the write data speed WR_SPEED is calculated based on information of four write commands WR_CMD_1, WR_CMD_2, WR_CMD_3, WR_CMD_4 included in the write command group WR_CMD_GRP. Further, the information of the four write commands WR_CMD_1, WR_CMD_2, WR_CMD_3, WR_CMD_4 is stored in an entry buffer including five entries.

In FIG. 14, at a time T1, transmission time information TR_TIME of A and a write data size WR_SIZE of 10 for the write command WR_CMD_1 are stored in the entry buffer.

At a time T2, transmission time information TR_TIME of B and a write data size of 25 for the write command WR_CMD_2 are stored in the entry buffer.

At a time T3, transmission time information TR_TIME of C and a write data size WR_SIZE of 15 for the write command WR_CMD_3 are stored in the entry buffer.

Finally, at a time T4, transmission time information TR_TIME of D and a write data size WR_SIZE of 7 for the write command WR_CMD_4 are stored in the entry buffer.

The write data speed WR_SPEED may be determined as follows, based on the difference D-A between the maximum value D and the minimum value A in the transmission time information TR_TIME described above, and the sum (10+25+15+7) of the above-described write data sizes WR_SIZE.

$$WR\_SPEED = (10+25+15+7)/(D-A)$$

In FIG. 15, descriptions will be made based on an entry buffer which is a circular buffer.

Referring to FIG. 15, at a time T1', transmission time information TR_TIME of D and a write data size WR_SIZE of 7 for a write command WR_CMD_1' are stored in the entry buffer. The transmission time information TR_TIME and the write data size WR_SIZE are stored in an entry which is indicated by an index 3 of the entry buffer.

At a time T2', transmission time information TR_TIME of E and a write data size of 33 for the write command WR_CMD_2' are stored in the entry buffer. The transmission time information TR_TIME and the write data size WR_SIZE are stored in an entry which is indicated by an index 4 of the entry buffer. An end index END_IDX of the entry buffer changes from 3 to 4.

At a time T3', transmission time information TR_TIME of F and a write data size of 6 for the write command WR_CMD_3' are stored in the entry buffer. At this time, since the entry buffer is full, transmission time information TR_TIME of A and a write data size WR_SIZE of 10 stored in an entry indicated by 0 as a start index START_IDX of the entry buffer are erased. The end index END_IDX of the entry buffer changes from 4 to 0, and the start index START_IDX changes from 0 to 1.

Finally, at a time T4', transmission time information TR_TIME of G and a write data size WR_SIZE of 19 for the write command WR_CMD_4' are stored in the entry buffer. At this time, since the entry buffer is full, transmission time information TR_TIME of B and a write data size WR_SIZE of 25 stored in an entry indicated by 1 as the start index START_IDX of the entry buffer are erased. The end index END_IDX of the entry buffer changes from 0 to 1, and the start index START_IDX changes from 1 to 2.

The write data speed WR_SPEED may be determined as follows, based on the difference G-C between the maximum value G and the minimum value C in the transmission time information TR_TIME described above, and the sum (15+7+33+6+19) of the above-described write data sizes WR_SIZE.

$$WR\_SPEED = (15+7+33+6+19)/(G-C)$$

Figure 16:
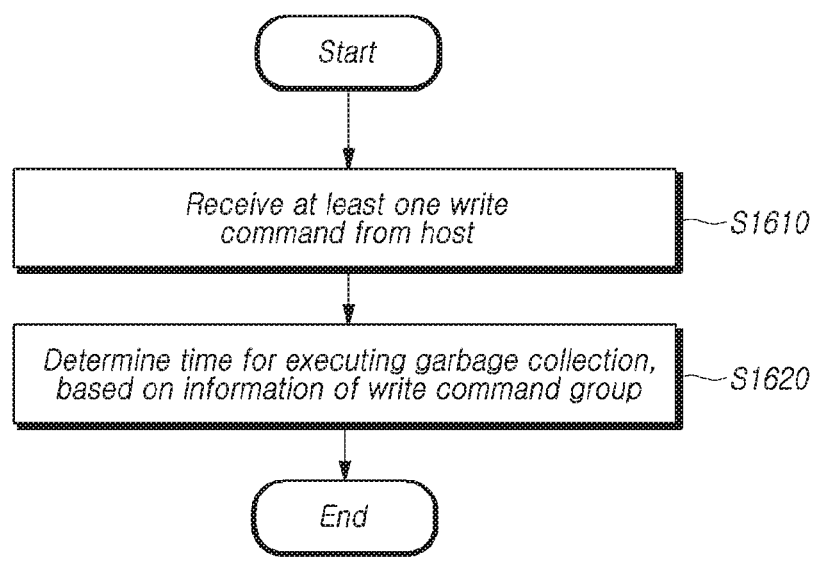
FIG. 16 is a flow chart for describing a method for operating a memory controller in accordance with an embodiment of the disclosure.

FIG. 16 is a flow chart of a method for operating the memory controller 120 in accordance with an embodiment of the disclosure.

The method for operating the memory controller 120 may include receiving at least one write command from the host (S1610).

The method for operating the memory controller 120 may include determining a time during which garbage collection is executed, based on the information of the write command group WR_CMD_GRP including at least one write command received from the host (S1620).

As described above with reference to FIG. 5, the information of the write command group WR_CMD_GRP may include, for each write command included in the write command group WR_CMD_GRP, transmission time information TR_TIME indicating a time point at which the host transmits the write command, and write size information WR_SIZE indicating a write data size of the write command. The above-described transmission time information TR_TIME may be absolute time information generated by the host.

Further, as described above with reference to FIG. 6, the write command group WR_CMD_GRP may include N number of write commands which are most recently transmitted by the host, where N is a natural number.

As described above with reference to FIG. 9, the information of the write command group WR_CMD_GRP may be stored in the entry buffer ENTRY_BUF which includes a plurality of entries. Each of the plurality of entries stored in the entry buffer ENTRY_BUF may include transmission time information TR_TIME and write size information WR_SIZE for a corresponding write command included in the write command group WR_CMD_GRP.

Furthermore, the above-described operation of the memory controller 120 may be controlled by the control circuit 123, and may be performed in such a manner that the processor 124 executes (drives) a firmware in which all operations of the memory controller 120 are programmed.

Figure 17:
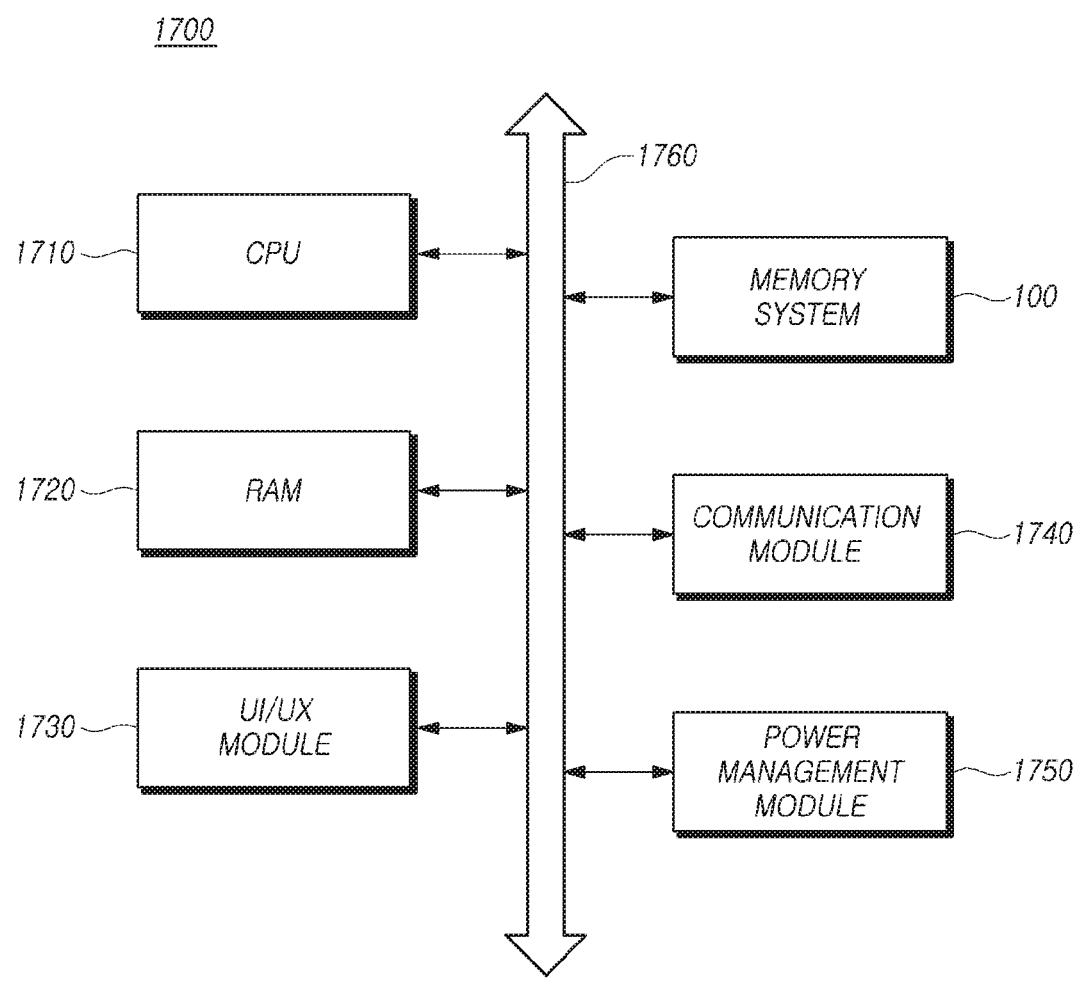
FIG. 17 is a configuration diagram illustrating an example of a computing system in accordance with an embodiment of the disclosure.

FIG. 17 illustrates an example of a computing system 1700 in accordance with an embodiment of the disclosure.

Referring to FIG. 17, the computing system 1700 in accordance with an embodiment of the disclosure may include a memory system 100, a central processing unit (CPU) 1710 for controlling general operations of the computing system 1700, a RAM 1720 for storing data and information related with operations of the computing system 1700, a UI/UX (user interface/user experience) module 1730 for providing use environment to a user, a communication module 1740 for communicating with an external device in a wired and/or wireless manner, and a power management module 1750 for managing power used by the computing system 1700, which are electrically coupled to a system bus 1760.

The computing system 1700 may include a PC (personal computer), a mobile terminal such as a smartphone and a tablet or various electronic devices.

The computing system 1700 may further include a battery for supplying an operating voltage, and may further include an application chipset, a graphic-related module, a camera image processor (CIS), a DRAM and so forth. It will be apparent to those skilled in the art that the computing system 1700 may include other components.

The memory system 100 may include not only a device which stores data in a magnetic disk, such as a hard disk drive (HDD), but also a device which stores data in a nonvolatile memory, such as a solid state drive (SDD), a universal flash storage (UFS) device and an embedded MMC (eMMC) device. The nonvolatile memory may include a ROM (read only memory), a PROM (programmable ROM), an EPROM (electrically programmable ROM), an EEPROM (electrically erasable and programmable ROM), a flash memory, a PRAM (phase-change RAM), an MRAM (magnetic RAM), an RRAM (resistive RAM), and an FRAM (ferroelectric RAM). In addition, the memory system 100 may be realized into various types of storage devices, and may be mounted in various electronic devices.

As is apparent from the above descriptions, according to an embodiment of the disclosure, it is possible to minimize a time in which processing a command transmitted from a host is delayed due to garbage collection.

Also, according to an embodiment of the disclosure, it is possible to ensure stable write performance.

Further, according to an embodiment of the disclosure, it is possible to secure free memory blocks in advance before the number of free memory blocks becomes insufficient.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted by the appended claims and encompass all equivalents falling within the scope of the appended claims.

What is claimed is:

1. A memory system comprising:
a memory device comprising a plurality of memory blocks; and
a memory controller configured to control the memory device,
wherein the memory controller determines a time for garbage collection, based on information for a write command group comprising a plurality of write commands inputted from a host, and
wherein the information for the write command group comprises, for each write command included in the write command group, transmission time information indicating a time point at which the host transmits the write command, and write size information indicating a write data size of the write command.

2. The memory system according to claim 1, wherein the write command group comprises N number of write commands which are most recently transmitted by the host, where N is a natural number.

3. The memory system according to claim 1, wherein the transmission time information is absolute time information generated by the host.

4. The memory system according to claim 1, wherein the transmission time information is generated based on a result value obtained by synchronizing relative time information with reference absolute time information generated by the host.

5. The memory system according to claim 1,
wherein the information for the write command group is stored in an entry buffer which comprises a plurality of entries, and wherein each of the plurality of entries comprises transmission time information and write size information for a corresponding write command included in the write command group.

6. The memory system according to claim 5, wherein the entry buffer is a circular buffer.

7. The memory system according to claim 1, wherein the time for the garbage collection is determined based on a write data speed that is calculated based on all or a part of the information for the write command group.

8. The memory system according to claim 7, wherein the faster the write data speed is, the more the time for the garbage collection is reduced.

9. The memory system according to claim 7, wherein the write data speed is calculated based on a difference between a maximum value and a minimum value of transmission time information included in all or a part of the information for the write command group, and a sum of write data sizes included in all or a part of the information for the write command group.

10. A memory controller comprising:
a memory interface configured to communicate with a memory device comprising a plurality of memory blocks; and
a control circuit configured to control the memory device,
wherein the control circuit determines a time for garbage collection, based on information for a write command group comprising a plurality of write commands inputted from a host, and
wherein the information for the write command group comprises, for each write command included in the write command group, transmission time information indicating a time point at which the host transmits the write command, and write size information indicating a write data size of the write command.

11. The memory controller according to claim 10, wherein the write command group comprises N number of write commands which are most recently transmitted by the host, where N is a natural number.

12. The memory controller according to claim 10, wherein the transmission time information is absolute time information generated by the host.

13. The memory controller according to claim 10, wherein the transmission time information is generated based on a result value obtained by synchronizing relative time information with reference absolute time information generated by the host.

14. The memory controller according to claim 10, wherein the information for the write command group is stored in an entry buffer which comprises a plurality of entries, and
wherein each of the plurality of entries comprises transmission time information and write size information for a corresponding write command included in the write command group.

15. The memory controller according to claim 14, wherein the entry buffer is a circular buffer.

16. The memory controller according to claim 10, wherein the time for the garbage collection is determined based on a write data speed that is calculated based on all or a part of the information for the write command group.

17. The memory controller according to claim 16, wherein the faster the write data speed is, the more the time for the garbage collection is reduced.

18. The memory controller according to claim 16, wherein the write data speed is calculated based on a difference between a maximum value and a minimum value of transmission time information included in all or a part of the information for the write command group, and a sum of write data sizes included in all or a part of the information for the write command group.

19. A method for operating a memory controller suitable for controlling a memory device, comprising:
receiving a plurality of write commands inputted from a host; and
determining a time for garbage collection, based on information for a write command group comprising a plurality of write commands inputted from the host,
wherein the information for the write command group comprises, for each write command included in the write command group, transmission time information indicating a time point at which the host transmits the write command, and write size information indicating a write data size of the write command.

20. The method according to claim 19, wherein the write command group comprises N number of write commands which are most recently transmitted by the host, where N is a natural number.

* * * * *